(12) United States Patent
Tuvian et al.

(10) Patent No.: US 9,298,454 B2
(45) Date of Patent: Mar. 29, 2016

(54) USING SPREADSHEETS AS A BASIS FOR ENHANCED APPLICATION DEVELOPMENT

(71) Applicant: Microsoft Corporation, Redmond, WA (US)

(72) Inventors: Uzi Tuvian, Herzliya (IL); Shahar Sonino, Petah-Tikva (IL); Shahar Prish, Herzliya (IL); Uval Blumenfeld, Raanana (IL); Dan Polak, Tel-Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/055,391

(22) Filed: Oct. 16, 2013

(65) Prior Publication Data

US 2015/0106782 A1 Apr. 16, 2015

(51) Int. Cl.
*G06F 9/44* (2006.01)
(52) U.S. Cl.
CPC .......................................... *G06F 8/76* (2013.01)
(58) Field of Classification Search
None
See application file for complete search history.

(56) References Cited

U.S. PATENT DOCUMENTS

| | | | |
|---|---|---|---|
| 7,523,395 B1 | 4/2009 | Namait et al. | |
| 8,082,489 B2 | 12/2011 | Jiang | |
| 8,250,117 B2 | 8/2012 | Olivieri et al. | |
| 2005/0268215 A1 | 12/2005 | Battagin et al. | |
| 2008/0244508 A1 | 10/2008 | Mantuano et al. | |
| 2010/0088662 A1* | 4/2010 | Tung et al. | 717/101 |
| 2013/0151938 A1 | 6/2013 | Waldman et al. | |

OTHER PUBLICATIONS

Gupta, Saurabh, "Building a Sites Application: Using Sites and Spreadsheets Together", Published on: Mar. 3, 2011, Available at: https://developers.google.com/apps-script/articles/building-sites-app-part1.
Engels, et al., "ClassSheets: Automatic Generation of Spreadsheet Applications from Object-Oriented Specifications", In 20th IEEE/ACM International Conference on Automated Software Engineering, Nov. 7, 2005, 10 pages.

* cited by examiner

*Primary Examiner* — Chuck Kendall
(74) *Attorney, Agent, or Firm* — Damon Rieth; Aaron Hoff; Micky Minhas

(57) ABSTRACT

Systems, methods, and software are disclosed herein for designing applications. In an implementation, a method comprises examining a spreadsheet to identify a plurality of spreadsheet components of the spreadsheet with which to generate a plurality of application components for potential inclusion in a software application under design. The method also comprises receiving user input comprising a plurality of design instructions to include in the software application at least some of the plurality of application components and generating at least an instance of the software application comprising the plurality of application components.

20 Claims, 10 Drawing Sheets

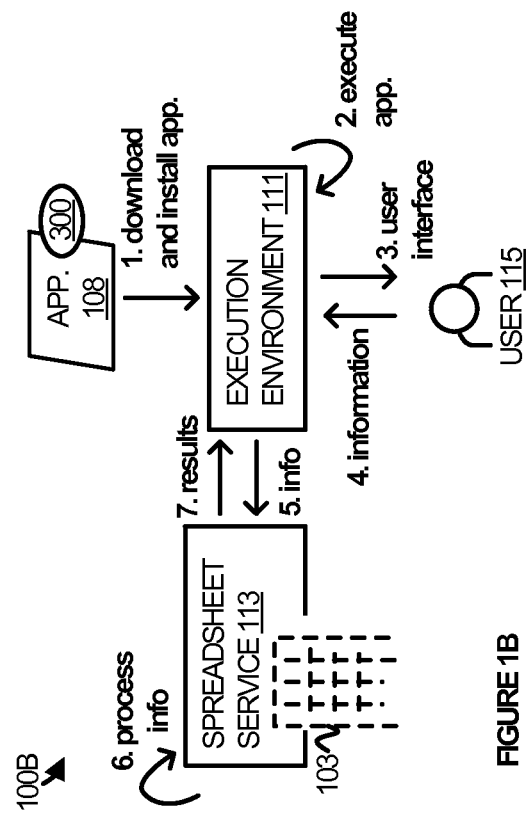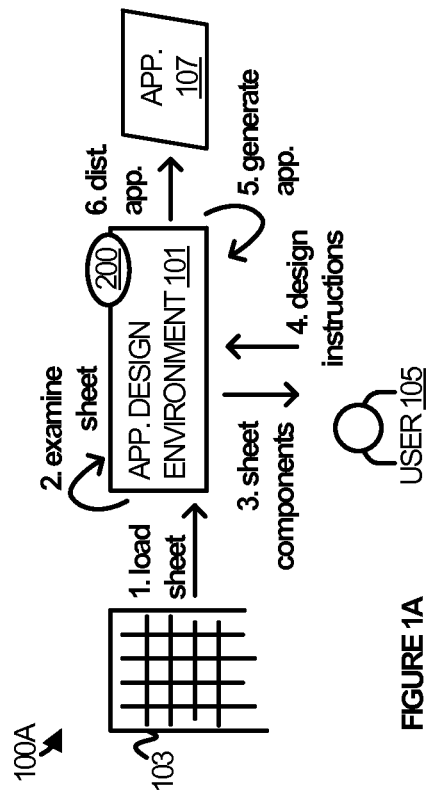

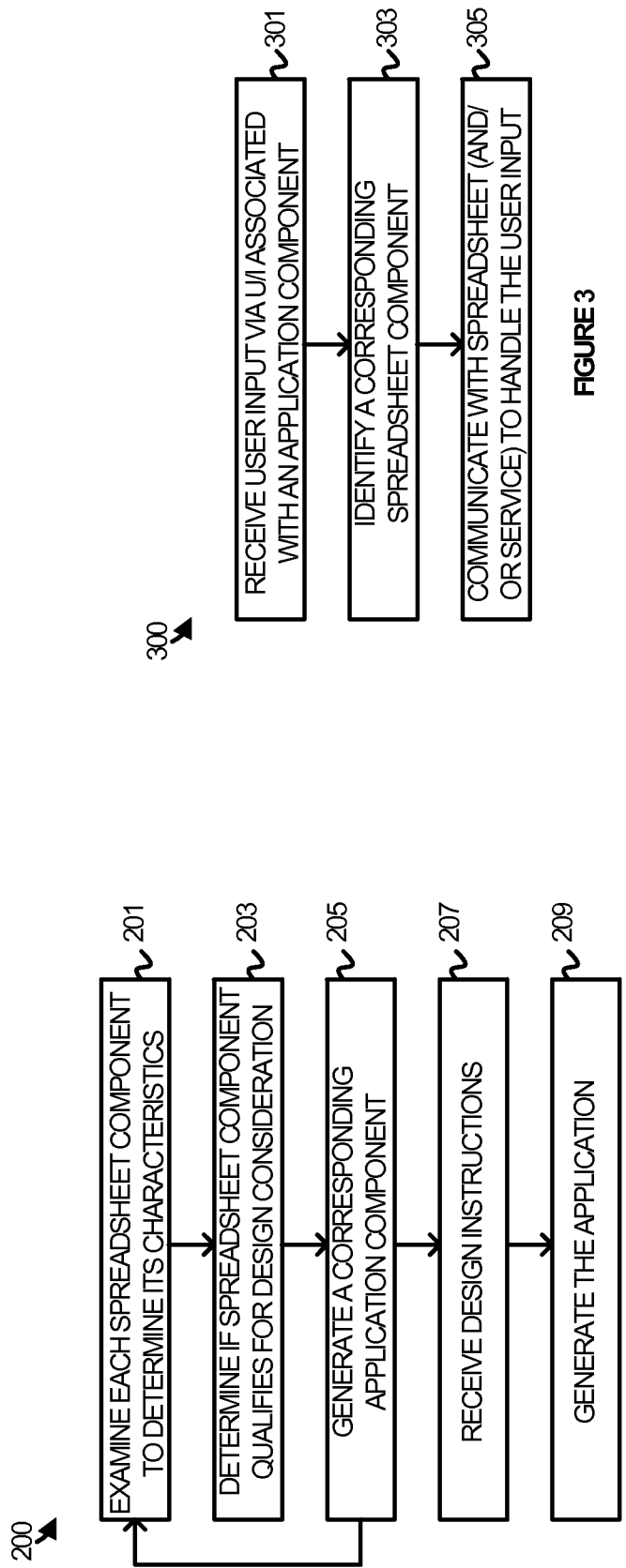

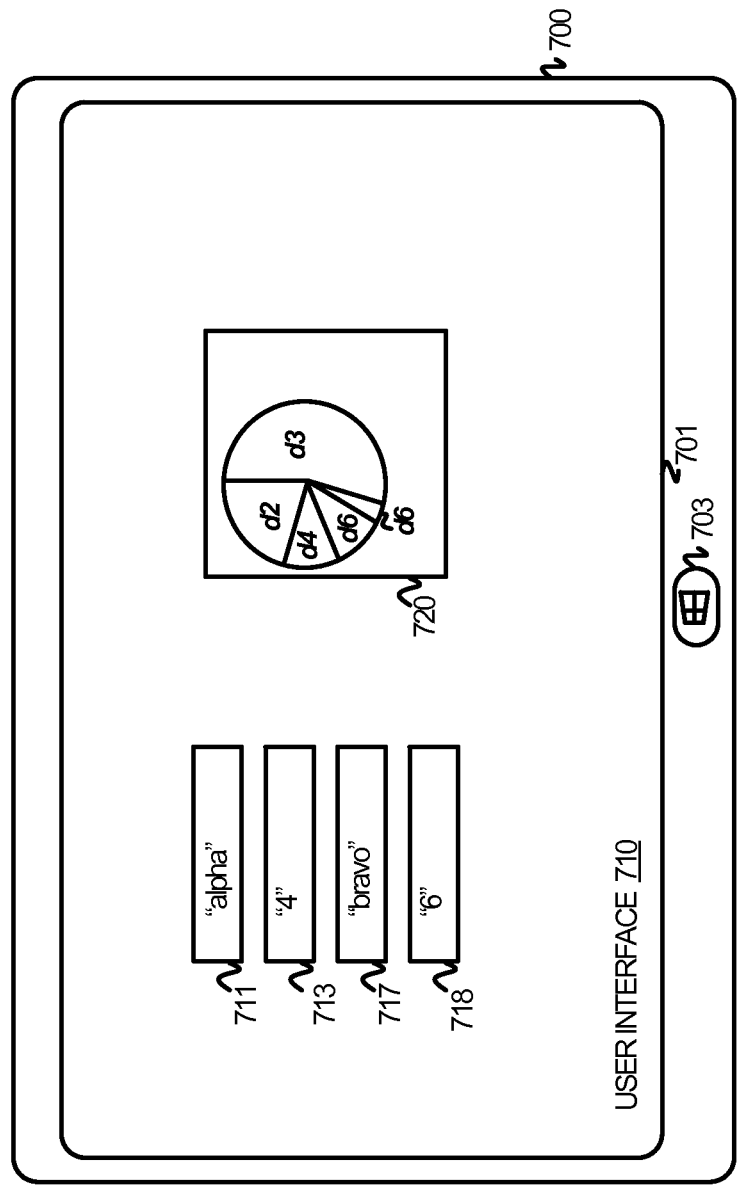

USING SPREADSHEETS AS A BASIS FOR ENHANCED APPLICATION DEVELOPMENT

TECHNICAL FIELD

Aspects of the disclosure are related to computing hardware and software technology, and in particular to software application design and development tools.

TECHNICAL BACKGROUND

Online application marketplaces, in which a variety of applications from many different sources are available for download, have become very popular. While almost any kind of application for any kind of computing environment is available in such marketplaces, they have become a dominant source of applications designed specifically for deployment in mobile and tablet environments, but are also available for desktop downloads.

For example, it is common for users to use their mobile phone to search in an "app store" for a desired application, such as a game, media application, or the like, which can then be downloaded and installed, or delivered as a web application, and run on their mobile phone with ease. Other types of applications are also available in this manner, including productivity applications with which spreadsheets, word processing documents, and other productivity items may be experienced.

Developing an application for distribution through an app store generally entails coding the application using any of a variety of programming languages, such as JavaScript, Objective C, C++, C#, or HTML5, or any other suitable language. An integrated development environment may be used when programming the application, examples of which include Eclipse, Xcode, AppCode, and Visual Studio. The applications are generally designed with a different form factor in mind for a mobile user experience relative to those designed for desktop or laptop computing environments.

Spreadsheets remain a popular way to accomplish various tasks, such as creating financial spreadsheets and managing budgets, and in fact may sometimes serve as applications of a sort. For example, a user may develop a particularly useful spreadsheet that accurately projects the resources needed for, and costs associated, with a meeting. That instance of the spreadsheet can be distributed to any number of people and used for their own individual purposes, in effect functioning much like an application having similar features would function. However, to develop such an application, as opposed to a spreadsheet, requires skills specific to application development beyond those typically associated with spreadsheet programming and design.

OVERVIEW

Provided herein are systems, methods, and software for implementing enhanced application development in which a spreadsheet may form the basis from which a software application is generated. In this manner, at least some of the features and functionality of a given spreadsheet may be made available as an application.

In at least one implementation, a spreadsheet taken as input to an application design environment may be examined to identify components of the spreadsheet with which to generate application components for potential inclusion in a software application under design. The application components can be presented for selection by a user. Which of the application components to include in the software application may be identified by design instructions received via user input. An instance of the software application may then be generated that includes those application components.

This Overview is provided to introduce a selection of concepts in a simplified form that are further described below in the Technical Disclosure. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 1A illustrates an operational scenario with respect to an application design environment in an implementation.

FIG. 1B illustrates an operational scenario with respect to an execution environment in an implementation.

FIG. 2 illustrates an enhanced design process carried out at least partly in an application design environment in implementation.

FIG. 3 illustrates an enhanced application process carried out at least partly in an execution environment in an implementation.

FIG. 7 illustrates an operational scenario associated with a software application designed from a spreadsheet in an implementation.

TECHNICAL DISCLOSURE

Figure 4:
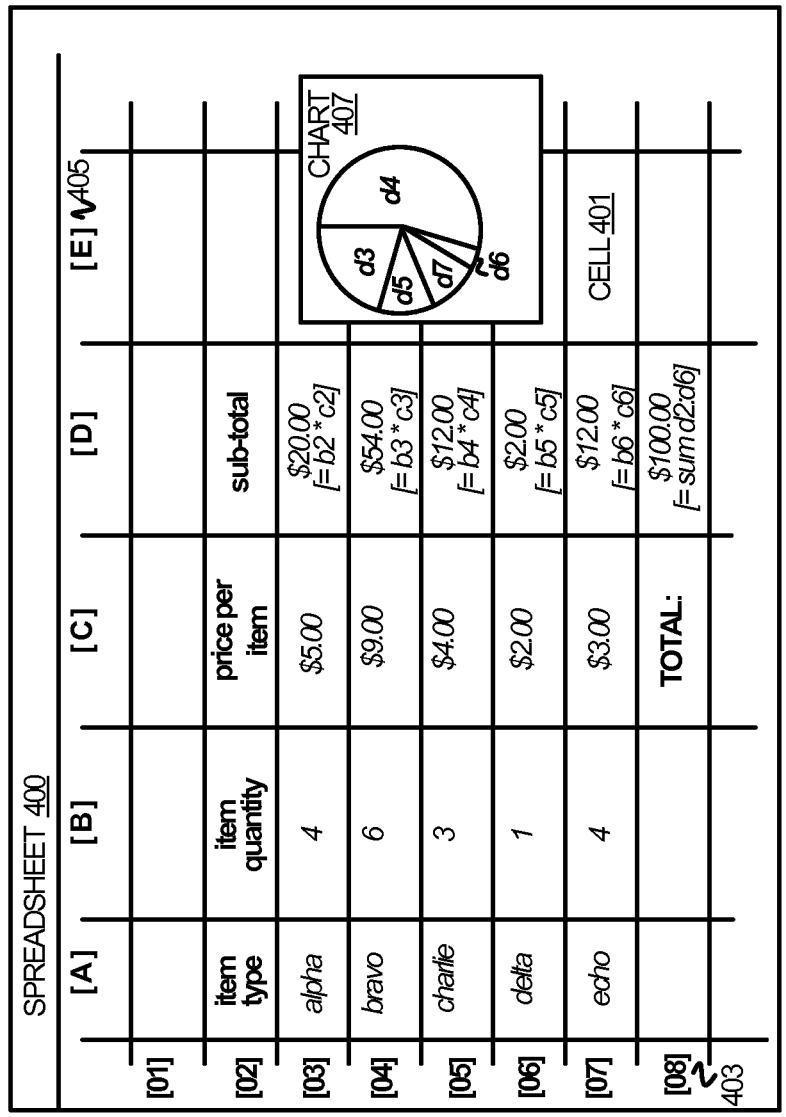
FIG. 4 illustrates a spreadsheet from which a software application may be designed in an implementation.

Implementations disclosed herein enable software applications to be developed from spreadsheets in an enhanced manner, thereby allowing the various features and functionality available in a spreadsheet to be experienced through an associated application. Such implementations may allow software applications to be developed by a user having a skill set oriented towards spreadsheet development rather than application development. In some implementations, the resulting software application may be published through an "app store" for end users to enjoy in any environment, although other delivery modes are possible.

In one implementation, a spreadsheet is examined in an application design environment to identify a set of spreadsheet components of the spreadsheet with which to generate various application components that could potentially be included in a software application under design. Examining the spreadsheet may include examining each cell of the spreadsheet to determine if the cell has associated therewith at least one of a set of characteristics, including a formula, a control, and information stored therein representative of a category for other information stored in other fields of the plurality of fields. If the cell does have any of such characteristics, then that cell qualifies as a spreadsheet component from which an application component may be generated. Other elements in addition to cells, such as controls and images that are rendered apart for a cell, may also be examined and selected for rendering as an application component.

Which of the application components to include in the resulting software may be indicated by design instructions received as user input to the application design environment. An instance of the software application, including those components, may then be generated. The user input may be received via a user interface to the application design environment. In some scenarios, the user interface may include a component view of the application components and a design canvas on which to design the software application via the user input.

The design instructions specifying which of the application components to include in the software application may each be an individual instruction to include one application component in the software application. For example, an individual instruction may be provided by way of a touch gesture that drags and drops an application component from the component view onto the design canvas. Other types of user input that are possible, in addition to or in place of touch gestures, include speech, mouse input, or keyboard input. In addition, menu selections, discrete commands, or some other operation in addition to or in place of drag and drop operations may be used.

In some implementations, a properties view may be available in the user interface through which properties of an application component can be viewed and possibly edited to change various characteristics of an application component. In one example, an application component may initially be characterized as one type of control, but may be edited through the properties view to be characterized as a different type of control. As a result, the application component may take on different behaviors or other aspects when rendered as part of the software application under design, relative to how it may have behaved had its initial properties been maintained.

The user interface in some implementations may also include an environment control through which to select an operating environment for the software application. The operating environment may be selected from a set of different operating environments, such as the Android®, iOS®, and Windows® operating environments. Other operating environments in addition to or in place of those disclosed herein are possible and may be considered within the scope of the present disclosure. The software application, once generated, may be published through an online application store ("app store") that may generally be associated with the chosen operating environment, or made available through some other suitable method of delivery.

In some implementations, a resulting software application drives a computing system to render a user interface to the software application that includes application components linked to various spreadsheet components in an associated spreadsheet. The software application may communicate through the spreadsheet with a spreadsheet service supporting the spreadsheet. In response to information received with respect to at least one application component, the software application communicates the information to a corresponding spreadsheet for processing by the spreadsheet service.

Figure 8:
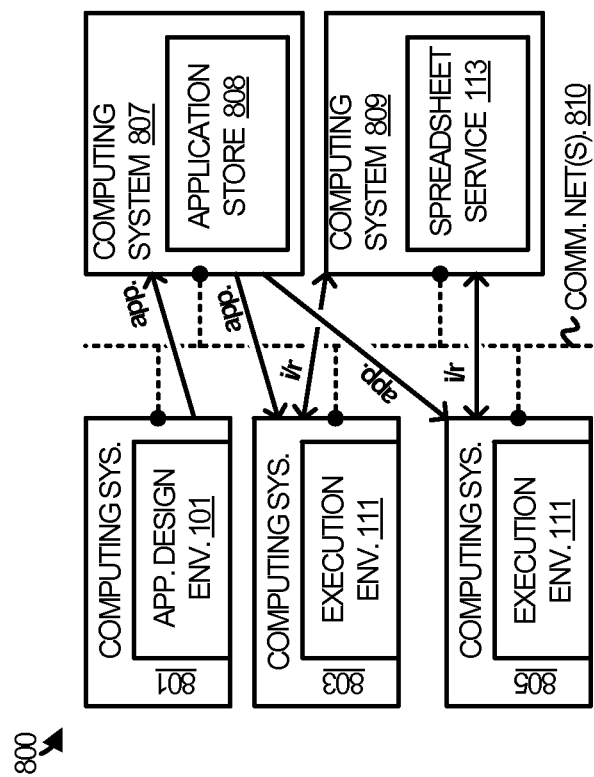
FIG. 8 illustrates a communication environment in an implementation.

Referring now to the drawings, FIG. 1A illustrates an operational scenario in which a software application is generated from a spreadsheet in an application design environment, while FIG. 1B illustrates the operation of the resulting application in an execution environment. FIG. 2 illustrates an enhanced design process carried out in the application design environment and FIG. 3 illustrates an enhanced application process carried out in the execution environment. FIG. 4 illustrates an exemplary spreadsheet, while FIGS. 5A-5D illustrate a user interface to an application design environment used to generate an application from the spreadsheet in FIG. 4. FIG. 6 and FIG. 7 both illustrate an exemplary software application. FIG. 8 illustrates a communication environment in which enhanced application development may be employed, while FIG. 9 illustrates a computing system suitable for implementing any of the various environments and processes disclosed herein.

Turning to FIG. 1A, operational scenario 100A is illustrated in which an application design environment 101 receives a spreadsheet 103 as input and by performing enhanced design process 200 illustrated in FIG. 2 in view of user input provided by user 105, generates an application 107.

Application design environment 101 is representative of any software environment in which enhanced design process 200 may be employed. For example, enhanced design process 200 may be implemented within the context of a productivity application, such as a spreadsheet application, word processor, or presentation application. In another example, enhanced design process 200 may be implemented within the context of a software design tool. In any case, the application or applications within which enhanced design process 200 may be provisioned may be delivered in variety of ways, for instance as a locally installed and executed application, as a streaming application, as a web application within the context of a browser, or in any other suitable manner.

Figure 9:
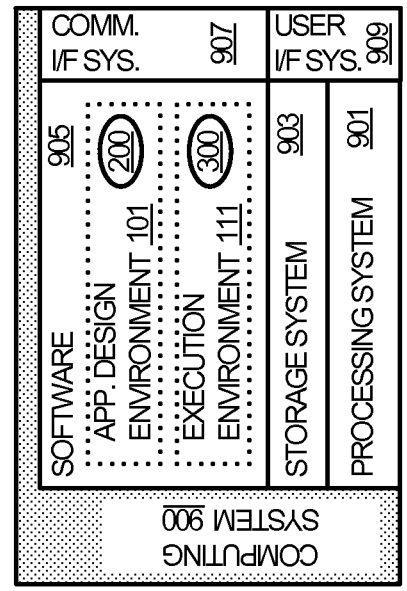
FIG. 9 illustrates a computing system suitable for implementing various processes and environments in various implementations.

Various types of physical or virtual computing systems may be used to implement enhanced design process 200 within the context of the aforementioned applications, such as server computers, desktop computers, laptop computers, tablet computers, smart phones, or any other suitable computing appliance, of which computing system 900, discussed below with respect to FIG. 9, is representative. The physical or virtual computing systems may be deployed independently as stand-alone systems, but may also be deployed in a cooperative fashion, such as in data centers or some other coordinated fashion that facilitates interaction in accordance with client-server principles.

Spreadsheet 103 is representative of any spreadsheet suitable for processing in application design environment 101 in order to generate application 107. Spreadsheet 103 may be representative of a single, stand-alone sheet, but may also be integrated within a workbook of sheets. Spreadsheet 103 may also be representative of multiple sheets that could be processed together to generate application 107. In yet other examples, spreadsheet 103 may be representative of a sheet or table integrated in another type of productivity document, such as a word processing document, presentation, or note taking document.

Spreadsheet 103 may include various spreadsheet components, such as cells, information and formulas within cells, images, and controls. At least some of the spreadsheet components may interact together to provide various features and functionality. For example, spreadsheet 103 may be used to implement an accounting, financial, or organizational tool. Other components in addition to or in place of those discussed herein are possible and may be considered within the scope of the disclosure.

Application 107 is representative of any software application generated by application design environment 101 using spreadsheet 103 as a basis. Examples of application 107 include but are not limited to "apps" that may be distributed through an app store for deployment in a variety of execution environments. However, application 107 may also be representative of applications distributed in some other manner other than an app store, such as from an application server, manual distribution, or through a service.

In operational scenario 100A, a user 105 interacts with application design environment 101 via a user interface (not shown) to direct the loading of spreadsheet 103. The user may interact with the user interface by way of touch-based gestures, mouse or keyboard interactions, spoken words, or in any other suitable manner.

In this exemplary scenario, it is assumed that spreadsheet 103 is loaded for purposes of generating application 107, although it may have been loaded for some other reasons, such as for editing, analysis, and the like. Accordingly, application design environment 101 examines spreadsheet 103 to identify at least some spreadsheet components with which to generate application components that may potentially be used when designing application 107, a more detailed discussion of which follows with respect to FIG. 2.

The application components are presented to user 105 via the user interface. User 105 provides design instructions via the user interface to identify which of the application components to include in application 107. The design instructions may also related to how the components are to be displayed and behave. Lastly, application design environment 101 generates application 107, which includes at least the selected application components.

Upon being generated by application design environment 101, application 107 may be published in a variety of ways for download and consumption in various execution environments, of which execution environment 111 illustrated in FIG. 1B is representative. In FIG. 1B, operational scenario 100B is illustrated in which an instance of application 107, represented by application 108, is downloaded and installed as in execution environment 111. Other mechanisms are possible in addition to or in place of downloading, such as providing a link to a web-based version of application 107.

Execution environment 111 is representative of any software environment in which application 108 may be executed and, by implication, in which enhanced application process 300 may be employed. For example, in some scenarios application 108 may be implemented in the context of a mobile operating system, such as Android®, iOS®, Windows Phone®, and Windows RTC®, as well as any other mobile operating system or variation. In other scenarios, application 108 may be implemented in the context of other operating systems, such as Windows®, OS X®, and Linux®, as well as another suitable operating system or variation. In yet other scenarios, application 108 may be implemented within the context of another application, such as browsers, productivity applications, gaming applications, or personal information management (email) applications, as well as any other suitable application, combination, or variation thereof.

Application 108, and by implication enhanced application process 300, may be provisioned and delivered in variety of ways, for instance as a locally installed and executed application, as a streaming application, as a web application or service that runs at least partly within the context of a browser, or in any other suitable manner. Various types of physical or virtual computing systems may be used to implement application 108 including smart phones, tablet computers, desktop or laptop computers, server computers, or any other suitable computing appliance, of which computing system 900, discussed below with respect to FIG. 9, is representative. The physical or virtual computing systems may be deployed independently as stand-alone systems, but may also be deployed in a cooperative fashion, such as in data centers or in some other aggregated fashion that facilitates interaction in accordance with client-server principles.

In operational scenario 100B, application 108 is downloaded and installed in execution environment 111. Application 108 may be downloaded from, for example, an app store, an application server, or some other application provisioning service. Application 108 may also be manually obtained and installed, such as by copying it from a storage device. Other mechanisms for downloading and installing application 108 are possible and may be considered within the scope of the present disclosure. In some implementations, application 108 need not be installed, but rather may be streamed or executed within the context of some other application that has been installed, such as a browser.

Eventually application 108 is executed in some manner, whether it be natively as an installed application or otherwise. Like many applications, as application 108 is executed, a user interface (not shown) to application 108 is presented to a user, represented in FIG. 1B by user 115. It may be appreciated that user 115 is a different user than user 105, which is intended to convey that an instance of application 107 has been distributed for use by other users other than user 105. However, it may be appreciated that user 105 could just as well engage with application 108 in the same manner as user 115.

Application 108 includes various application components that, per the discussion above with respect to FIG. 1A, correspond to various spreadsheet components in spreadsheet 103. User 115 may from time to time interact with at least some of the application components through the user interface in order to, for example, input information, view information, or otherwise engage with the various features and functionality provided by application 108. When this occurs, the information is communicated to spreadsheet service 113 by execution environment 111 for processing. A result of the processing may be returned to execution environment 111 for presentation to user 115.

Spreadsheet service 113 is representative of any service capable of processing information within the context of a spreadsheet. In some examples, spreadsheet service 113 may be representative of a spreadsheet application into which spreadsheet 103 may be loaded, such as Microsoft® Excel®. Spreadsheet service 113 may also be representative of a module or other portion of a spreadsheet application, such as a calculation engine. In some scenarios, spreadsheet service 113 is implemented as a web-based service, of which the Microsoft® Excel® Web App is one example. In other scenarios spreadsheet service 113 may be implemented on a private application server, or even be implemented locally with respect to execution environment 111, for instance as a locally installed application.

In a brief example, application 108 may include an application component that is an editable control through which a value can be entered by user 115. The value can be communicated to spreadsheet service 113 for processing within the context of a formula or some other relationship expressed in spreadsheet 103. Spreadsheet service 113 may input the value into an associated formula, evaluate in the context of a chart or graph, or process the value in some other manner. Regardless, a result of the processing is returned to execution environment 111 for presentation to user 115 via the user interface. The result may be another value, an updated graph, a change in application state, or some other result.

FIG. 2 illustrates enhanced design process 200 which, as mentioned previously, may be performed within the context of loading a spreadsheet in application design environment 101. In particular, enhanced design process 200 may be employed when spreadsheet 103 is initially examined for spreadsheet components that may be useful during the design of a corresponding software application. The following discussion makes reference parenthetically to the steps illustrated in FIG. 2 for purposes of clarity, although it may be appreciated that additional steps are possible.

In operation, application design environment 101 examines each spreadsheet component of spreadsheet 103 to determine its characteristics (step 201). For instance, each cell in spreadsheet 103 may be examined to determine if it has any of the following characteristics: a value stored therein; a name associated with it; whether or not it contains a formula; and whether or not it is referenced by a formula in another cell. In another example, each graphical object in spreadsheet 103 may be examined to determine its significance, such as whether or not it is tied to or otherwise associated with any cell or group of cells. Other characteristics are possible and may be considered within the scope of this disclosure.

After determining a spreadsheet component's characteristics, application design environment 101 determines whether or not the spreadsheet component qualifies for design consideration (step 203). In other words, it is determined whether or not a given spreadsheet component is important enough to merit rendering as an application component in a design canvas used to design a software application from spreadsheet 103. Whether or not a spreadsheet component qualifies can be determined based on a set of programmable rules or settings. In a brief example, blank cells likely would not qualify, whereas cells having formulas contained therein would qualify. In some examples, blank cells would qualify if referenced by other cells. In another example, whether or not a cell is referenced by another cell or cells may also be an indicator of importance. The fact that a cell may be referenced by several other cells but does not itself reference any cells may indicate that the cell provides an input function to several formulas, in which case it may be deemed important. In yet another example, a lone cell that is neither referenced by nor references any other cells may be important if it conveys important information. Thus, a wide variety of rules may be applied to determine whether or not a cell is important enough to be considered during the design stage. It may be appreciated that which cells are deemed important may be merely a suggestion that assists the users with designing an application.

Next, for any spreadsheet component that qualifies, a corresponding application component is generated for rendering in a user interface of application design environment 101 (step 205). The application component may thus be considered by user 105 for inclusion in application 107. Generating the application component may be accomplished by using an automated programming tool capable of taking a defined input, such as a spreadsheet component or a description thereof, and producing a corresponding application component in accordance with a particular coding paradigm. The application component may be one of variety of types of components or controls, such as a text box, a drop-down menu, a radio button, or the like. Determining which type of control an application component should be can be based on how a particular spreadsheet component, such as a cell, relates to other spreadsheet components.

For example, if the spreadsheet component is a cell with a drop-down menu in it, then the corresponding application component can be a drop-down menu. In another example, if it appears that the spreadsheet component is a cell that serves as input to a formula or formulas, then the corresponding application component can be rendered as a text box. It may be appreciated that even if an application component is defined as one kind of control, it may be changed later to a different kind of control via user input. It may also be appreciated that such determinations may be merely suggestions and may be open to changing by the user.

It may also be appreciated that steps 201-205 repeat for each spreadsheet component in spreadsheet 103. Once the examination of spreadsheet 103 is complete, the various application components available for selection during the design process can be presented to user 105 and design instructions are received via user input from user 105 (step 207). The design instructions may indicate which of the application components to include in the application to be generated since it may be useful to exclude some of the application components. The design instructions may be communicated in a variety of ways, such as by touch gestures, mouse clicks, keyboard strokes, voice commands, or any other suitable type of user input.

In one scenario, a selected application component can be dragged and dropped onto a design canvas to indicate that it is to be included in the application. Any application component dropped onto the canvas can be positioned in a manner in which it is to be rendered in the application. In another scenario, an application component can be designated for inclusion in the application by way of a menu option of setting that can be toggled or selected to indicate as much. Other interactions may also be possible, such as viewing properties of the application components, changing the format or type of a given application component, or labeling a component. In addition, other application components not derived from the spreadsheet 103 can be included, such as labels, images, and the like.

After user 105 has completed designing the application 107, the application 107 can be generated (step 209). Generating the application 107 may involve various steps, including generating code associated with each application component. In other words, each application component selected for inclusion in the design is, at the time of the selection, a visual or graphical representation of an underlying component that will need to be coded. Each application component can be converted automatically into a coded version of itself. The coding may occur in accordance with a variety of programming languages, such as Objective-C, C, C++, HTML, CCS, and JavaScript, as well as any other suitable language. In some implementations, coding may not occur in the aforementioned sense. Rather, a definition document or shell may be created that references pre-created. At run-time, the pre-created code can be fetched and loaded to implement the application.

In order to automatically generate the code for each application program, a library of code can be produced beforehand that may be accessed. The code library may include, for example, template code for a text box, a drop-down menu, or any other type of control represented by any of the application components in the design. The template code can be customized to fit a given application component and include in the program code for the application. Coding the application components may also include linking the application components to their corresponding spreadsheet components so that at run-time communication can ensue between application 107 and spreadsheet service 113. Depending upon the implementation, yet other steps may be performed, such as compiling the code into a format suitable for a particular environment.

Once application 107 is generated, it may be uploaded to an app store or some other platform for distribution to a wider audience. Instances of the application 107 may be downloaded and deployed within variety execution environments. FIG. 3 illustrates enhanced application process 300 which, as mentioned previously, may be performed within the context of downloading and running application 108 in execution environment 111.

In operation, application 108 is loaded and executed in execution environment 111. Like many applications, a user interface to application 108 may be rendered and displayed to user 115. User 115 can interact with various application components included in the user interface, such as text boxes, drop down menus, and the like. As user 115 interacts with the application components, user input is received (step 301). The user input may include information, such as a value, text input, or some other information.

Assuming the user input is received with respect to an application linked to spreadsheet 103, a spreadsheet component is identified that corresponds to the application component with which user 115 interacted (step 303). Execution environment 111 communicates with spreadsheet service 113, possibly via spreadsheet 103, to forward the information for processing within the context of spreadsheet 103 (step 305). Spreadsheet service 113 can process the information to, for example, execute a related formula, update a graph, or perform any number of other spreadsheet operations with respect to the information. A result of the process may be returned to execution environment 111.

FIG. 4 illustrates an exemplary spreadsheet 400, while FIG. 5 illustrates a user interface 500 to a software design application that may be used to generate an application based on spreadsheet 400. Spreadsheet 400 includes various spreadsheet components that, when examined per enhanced design process 200, form the basis of various application components rendered in user interface 500.

The spreadsheet components in spreadsheet 400 include cells 401 defined by rows 403 and columns 405. In addition, spreadsheet 400 includes a chart 407 having graphics and values derived from some of the cells 401. Each cell may have associated therewith a characteristic or characteristics, such as its value, its name, whether or not it contains a formula, which cells it may reference, which cells may reference it, or any other type of characteristic. Other examples include the presence or association of any controls with a given cell, such as a drop down box or selection list. Other types of spreadsheet components, such as a graph or image, may also have similar characteristics associated therewith.

In this example, a simple financial or account tools has been created in spreadsheet 400 to assist with tracking the relative costs associated with each of multiple items. Row number 2 defines multiple columns of data: item type, item quantity, price per item, and a sub-total for each item. Each cell in the sub-total column includes a formula that multiplies the item quantity with the price per item. A grand total is provided in cell D8 by a sum formula that sums the sub-totals.

Chart 407 illustrates a comparison of sub-totals for each item type. Each sub-total is represented as its share of the grand total. Thus, the sub-total in cell D8 representative of the share of costs associated with the item type "bravo" is approximately 54%, and so on. As the values change from time to time in spreadsheet 400, so too would chart 407.

When subject to an application design process, such as enhanced design process 200, the spreadsheet elements illustrated in FIG. 4 would be examined, cataloged, and evaluated for their relative importance. If a given spreadsheet component is deemed important enough, then a corresponding application component can be generated for consideration during the application design process.

As an example, cell A1 would be deemed unimportant when examined, as it contains no text, values, or controls, nor is it referenced by any cells. However, cell A1 may be deemed important as it contains text. Another cell that may be deemed important is D3 as it contains a formula that references two other cells. Of course, chart 407 would likely be deemed important due to its dynamic nature and its reference to a number of cells.

While the tool in spreadsheet 400 is relatively contained within a limited number of cells for illustrative purposes, in practice a spreadsheet may include cells of important distributed throughout the sheet. In addition, a spreadsheet may include multiple tools. In yet another variation, multiple sheets may be included in a single workbook that is examined for design purposes. Thus, it may be beneficial to examine a spreadsheet for its important components so as to simplify or at least streamline the design process.

Figure 5A:
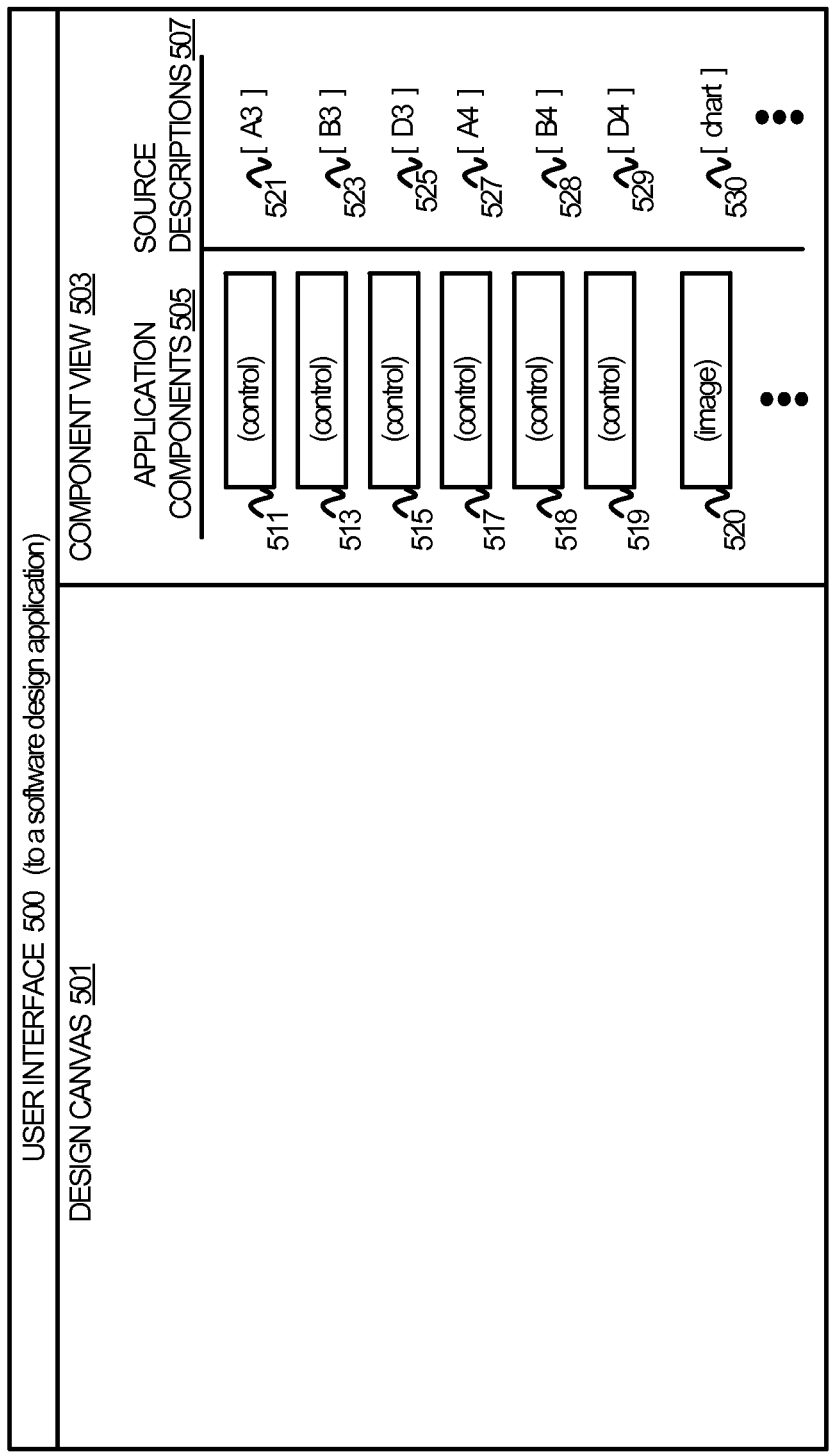
FIG. 5A illustrates a user interface to an application design environment that may be experienced when designing a software application in an implementation.
Figure 6:
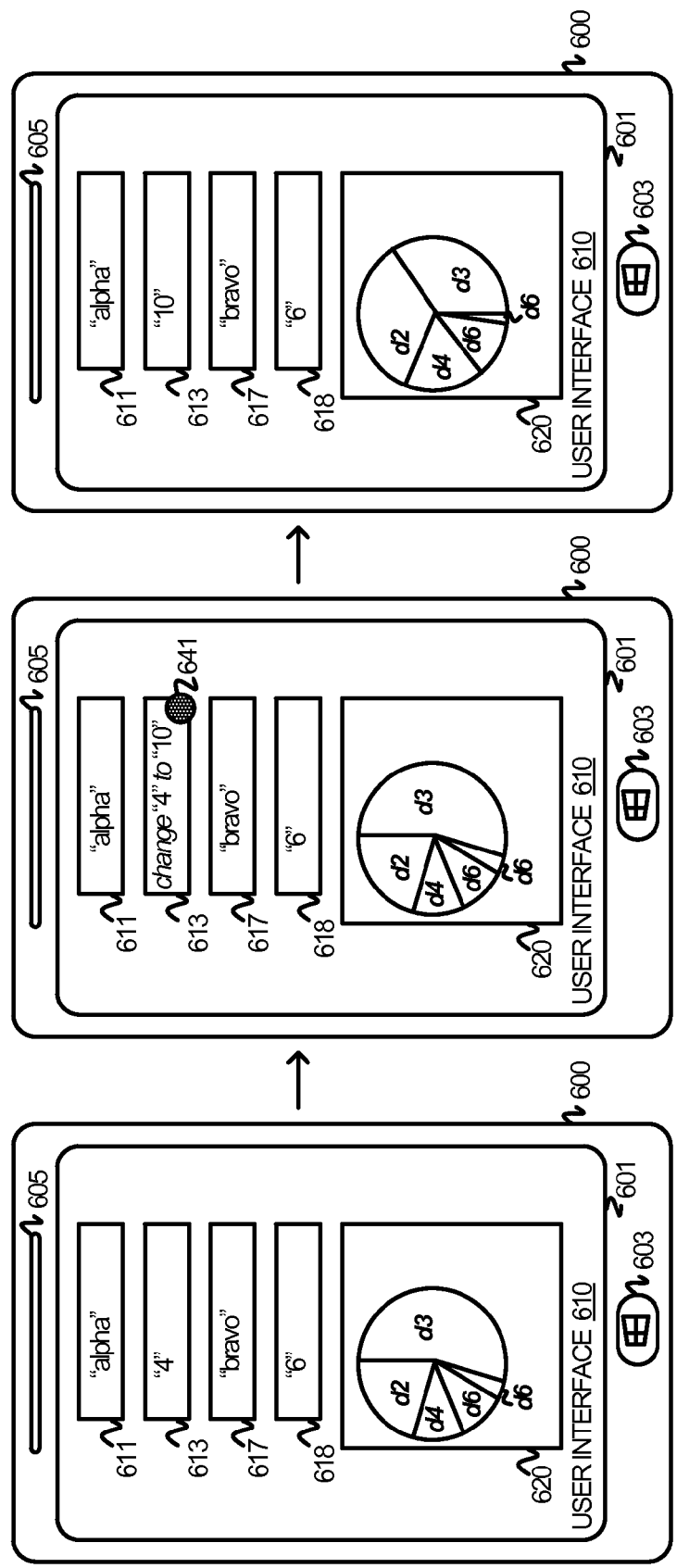
FIG. 6 illustrates an operational scenario associated with a software application designed from a spreadsheet in an implementation.

FIG. 5A illustrates user interface 500 in an example of what may be presented upon spreadsheet 400 being examined. User interface 500 is also representative of a user interface to any design application that can be used to generate an application using a spreadsheet as a basis. User interface 500 includes design canvas 501 and component view 503. Design canvas 501 is any canvas onto which application components 505 may be moved from component view 503. Component view 503 is any view in which application components 505 generated from spreadsheet 400 may be staged for design purposes. Component view 503 also includes source descriptions 507 that describe the source of each application component in spreadsheet 400.

In this example, spreadsheet 400 has been examined for important spreadsheet components and application components 505 have been generated from those spreadsheet components. For exemplary purposes, a set of application components 511-520 are illustrated, as well as corresponding descriptions 521-530 for each application component. Application component 511 is a control that corresponds to cell A3, per description 521, while application component 513 is a control that corresponds to cell B3, per description 523. Application component 511 and application component 513 thus correspond to two cells that are adjacent to each other in spreadsheet 400.

However, the next component, application component 515, is a control that corresponds to cell D3, per description 525. Note that an application component corresponding to cell C3 is not included in component view 503. This may have occurred for a variety of reasons, including that cell C3 was deemed unimportant. Alternatively, cell C3 may have been deemed important, but is filtered out of component view 503, or is otherwise excluded from component view 503 for some other reason.

Continuing with the application components 505, application components 517, 518, and 519 are also controls and correspond to cells A4, B4, and D4, respectively, per descriptions 527, 528, and 529. Application component 520 is an image that corresponds to chart 407, per description 530.

In operation, a user may interact with user interface 500 to position any of the application components 505 on design canvas 501 in any manner so desired. How the components are arranged in design canvas 501 will govern how they are rendered in any resulting application that is generated.

Figure 5B:
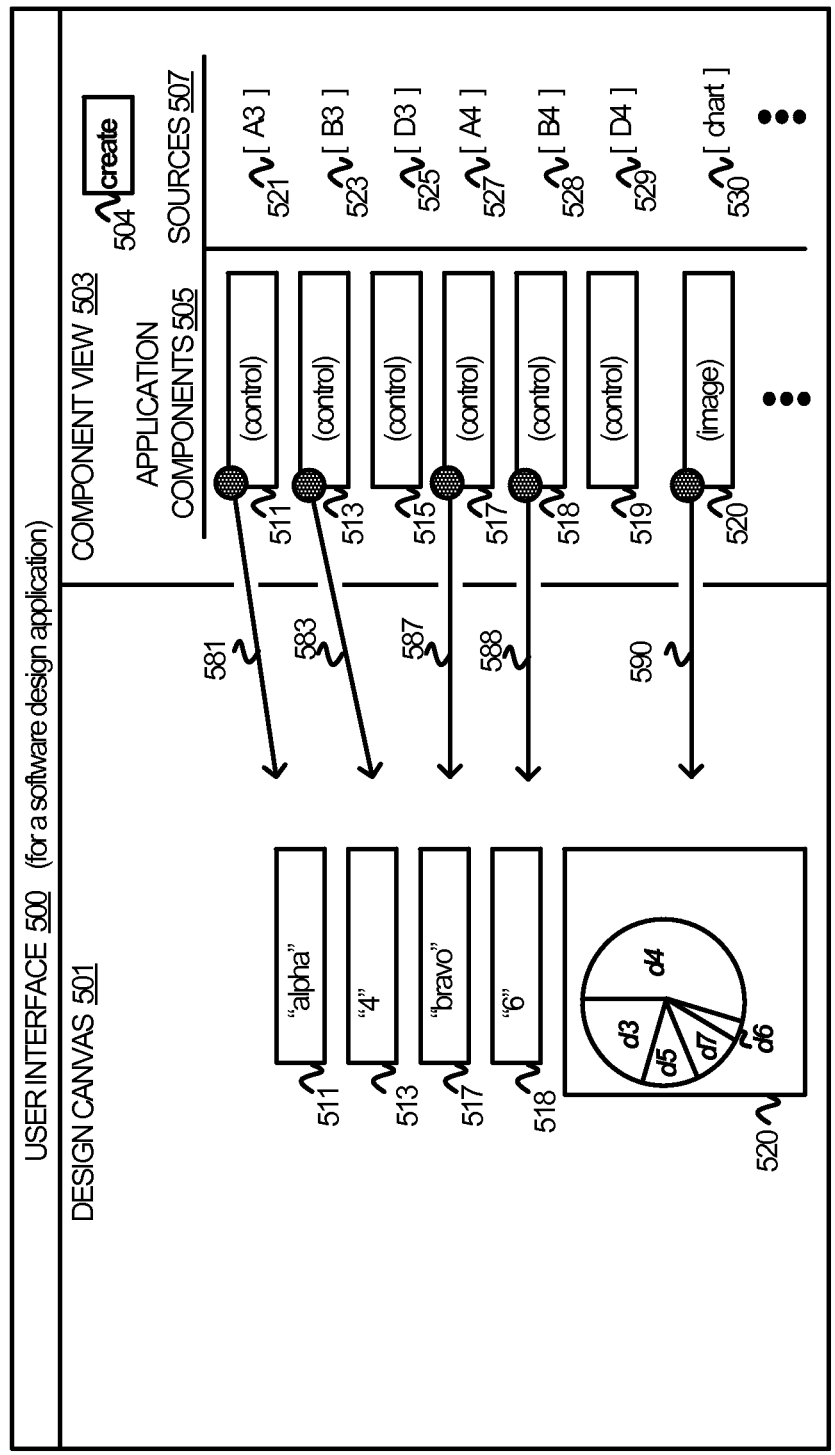
FIG. 5B illustrates a user interface to an application design environment and various associated operations in an implementation.

FIG. 5B illustrates one such operational scenario in which user input is received to position some of the application components on design canvas 501. The user input may be received in the form of touch inputs, for example, dragging and dropping some of the application components onto the design canvas 501. In particular multiple design instructions 581, 583, 587, 588, and 590 are received in a sequence of drag and drop gestures to move and position application components 511, 513, 517, 518, and 520 onto the design canvas 501. A command graphic 504 may be selected by user input to generate an application based at least in part on how the selected application components are positioned on design canvas 501.

Figure 5C:
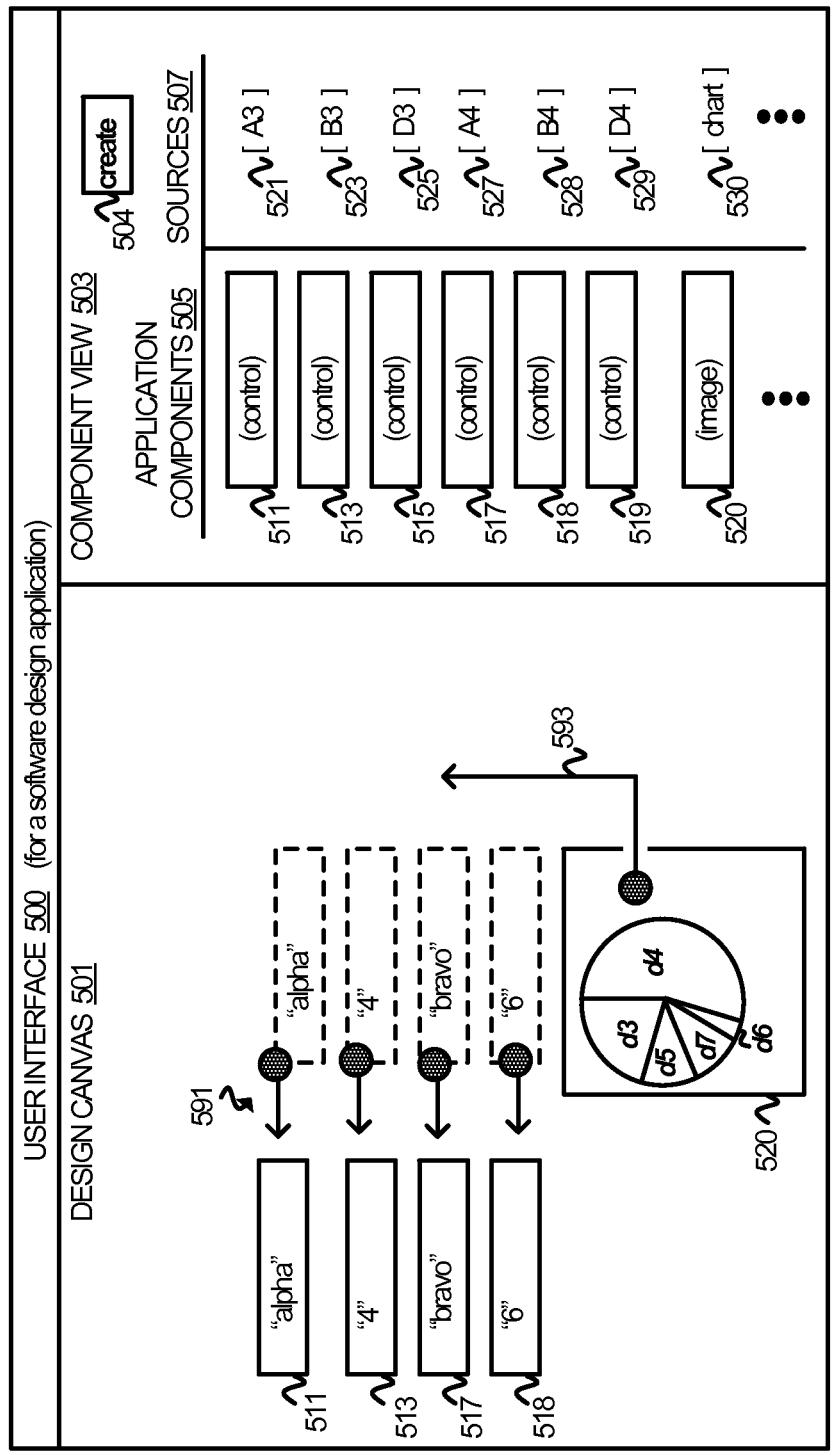
FIG. 5C illustrates a user interface to an application design environment and various associated operations in an implementation.

FIG. 5C illustrates another operational scenario that follows the scenario illustrated in FIG. 5B. In FIG. 5B, various application components were positioned on design canvas 501. In FIG. 5C, the application components are repositioned by user input 591 and 593 to new regions of design canvas 501. This scenario illustrates the relative ease with which application components can be positioned and repositioned on design canvas 501, thus reducing the effort needed to design the look and feel of an application.

Figure 5D:
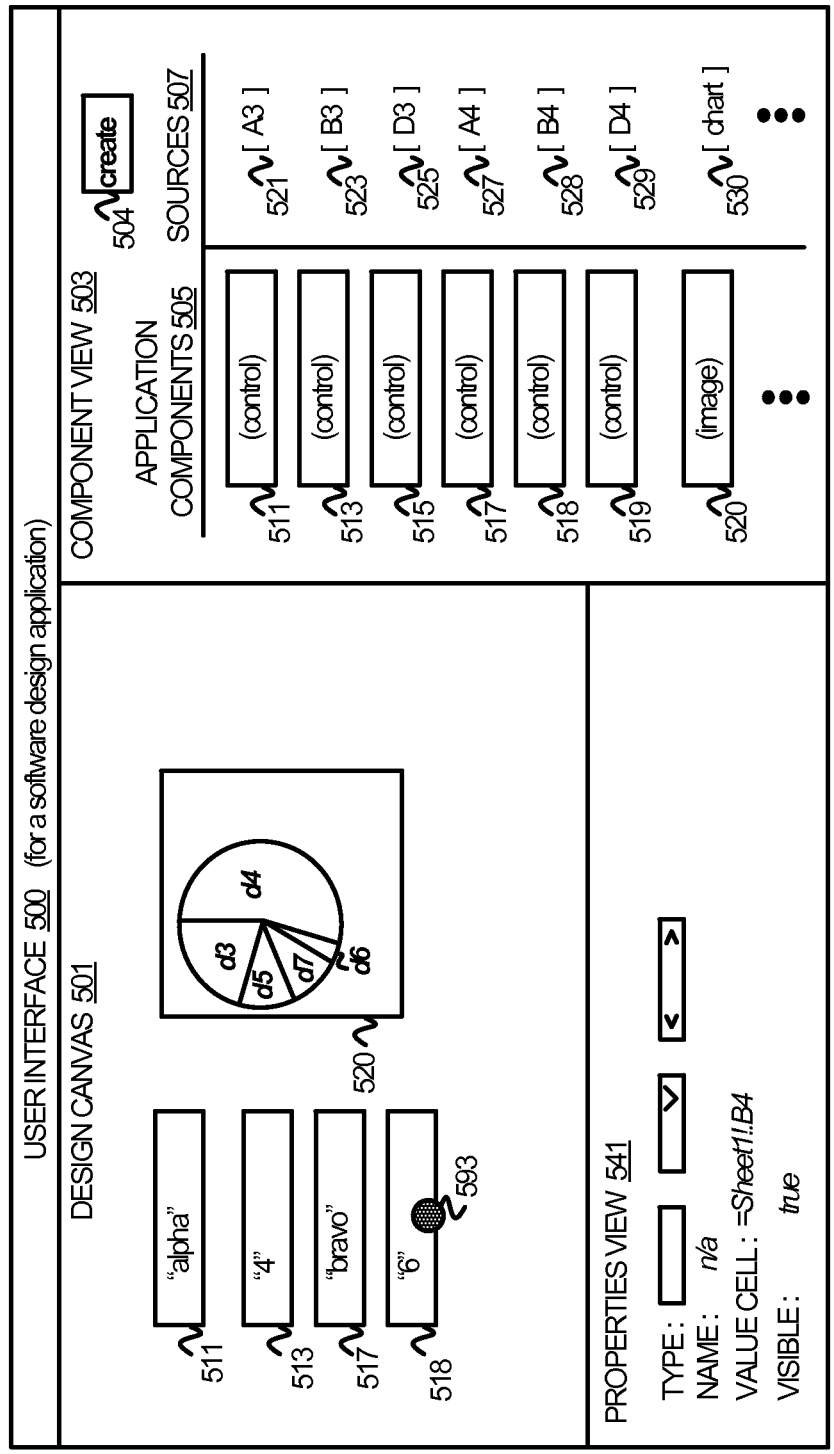
FIG. 5D illustrates a user interface to an application design environment and various associated operations in an implementation.

FIG. 5D illustrates yet another scenario that follows on those in FIG. 5B and FIG. 5C. In FIG. 5D, application component 518 is selected by user input 593 for viewing of its properties. Accordingly, the properties of application component 518 and various properties options and rendered in properties view 541. For example, the type or format of application component 518 is displayed, as well as several other types to which it may be changed by user selection. In addition, the name of a cell, if any, corresponding to application component 518 is displayed, as well as the value of that cell and its visibility. It may be appreciated that other properties in addition to or in place of those disclosed herein are possible and may be considered within the scope of the present disclosure.

Through properties view 541, the properties of application component 518 may be viewed and possible edited. For instance, if application component 518 is initially configured as a text box that serves as input to a formula, its type or format can be changed to a drop down box that provides a menu of values to select for input to the formula.

FIG. 6 and FIG. 7 together illustrate how an application may be designed differently via user interface 500 for deployment to devices having different form factors. In addition, FIG. 6 illustrates some of the dynamics that may be encountered when interacting with an application generated from a spreadsheet, such as application 108.

In particular, FIG. 6 illustrates a computing device 600 in an operational scenario that demonstrates how an application that is designed via user interface 500 may appear when executed. Computing device 600 includes a display 601, a control element 603, and an audio element 605. A user interface 610 to an instance of the application is displayed.

User interface 610 includes various application components that correspond to the application components selected during the design stage using user interface 500. The application components include four controls 611, 613, 617, and 618 into which value or text may be entered or through which data or text resulting from the evaluation of formulas may be displayed. Note that for exemplary purposes the values in controls 611, 613, 617, and 618 correspond to values in certain cells in spreadsheet 400 linked to the same controls. In addition, user interface 610 includes an image 620 that corresponds to the chart 407 illustrated in FIG. 4.

In operation, a user may interact with user interface 610 to, for example, enter new data. In this scenario, user input 641 is entered with respect to control 613. The value of control 613 is changed from 4 to 10. This change is communicated by the underlying application to a spreadsheet service, of which spreadsheet service 113 may be representative. The spreadsheet service is tasked with evaluating the change and re-evaluating any other formulas, cells, or any other elements that may be implicated by the change. New results are communicated back to the underlying application for surfacing in user interface 610. Thus, the change in value of control 613 to "10" causes a change in several other values that may also drive a change to chart 407, such as the sub-totals and totals in spreadsheet 400. Chart 407 is updated by the spreadsheet services and image 620 is refreshed to reflect the update.

FIG. 7 illustrates another exemplary layout for an application that may be generated using user interface 500. In FIG. 7, computing device 700 includes a display 701 and a control element 703. User interface 710 to the application is displayed on display 701 and includes various application components that correspond to those selected during the design stage. In particular, user interface 710 includes control 711, control 713, control 717, and control 718. User interface 710 also includes image 720 that corresponds to chart 407.

FIG. 8 illustrates a communication environment 800 that is representative of any environment in which the various operational scenarios and processes discussed herein may be carried out. Communication environment 800 includes communication network 810 over which computing systems 801, 803, and 805 may possibly communicate with computing system 807, with computing system 809, and with each other, in the context of designing and application or executing the application.

Examples of computing systems 801, 803, and 805 include, but are not limited to, desktop computers, work stations, laptop computers, notebook computers, tablet computers, mobile phones, personal digital assistances, media devices, gaming devices, and any other physical or virtual computing machine or combinations and variations thereof. Computing systems 801, 803, and 805 may each be capable of implementing at least one of an application design environment 101 and an execution environment 111. Computing system 900 illustrated in FIG. 9 is representative of computing systems 801, 803, and 805. Computing device 600 and computing device 700 illustrated in FIG. 6 and FIG. 7 respectively are also representative of at least computing systems 803, and 805.

Application design environment 101 may be embodied in program instructions that, when executed by computing system 801 directs computing system 801 to operate as described herein for application design environment 101 and enhanced design process 200. The program instructions may take the form of compiled object code, interpreted scripts, or any other suitable form of program instructions directly or indirectly executable by computing system 801.

Execution environment 111 may also be embodied in program instructions that, when executed by computing system 803 or computing system 805 directs computing system 803 or computing system 805 to operate as described herein for execution environment 111 and enhanced application process 300. The program instructions may take the form of compiled object code, interpreted scripts, or any other suitable form of program instructions directly or indirectly executable by computing system 801 or computing system 805.

Computing system 807 may be any computing system or collection of computing systems capable of implementing an application store 808, of which computing system 900 is representative. Computing system 809 may also be any computing system or collections of system capable of implementing a spreadsheet service 113, of which computing system 900 is representative. Examples of both include server computers, cloud computing platforms, data centers, and any physical or virtual computing machine, as well as any variation or combination thereof.

In operation, computing system 801 may communicate from time to time with computing system 807 to upload an application designed in application design environment 101 to the application store 808. The application may be communicated by computing system 807 to either or both of computing system 803 and computing system 805 for loading and running in execution environment 111. When running the application, computing system 803 and computing system 805 may communicate with computing system 809 to facilitate the exchange of information and results between spreadsheet service 113 and the application.

Communication between any of the elements contemplated in FIG. 8 may occur in accordance with various communication protocols, such as the Internet protocol (IP, IPv4, IPv6, etc.), the transfer control protocol (TCP), and the user datagram protocol (UDP), as well as any other suitable communication protocol, variation, or combination thereof. Communication network 810 may be representative of a network or collection of networks over which the elements contemplated in FIG. 8 may exchange information, such as an intranet, the Internet, a local area network, a wide area network, a wireless network, a wired network, or any combination or variation thereof. Communication network 810 may include connections, devices, and communication media, such as metal, glass, air, or any other suitable communication media over which information may be exchanged. The aforementioned communication media, networks, connections, protocols, and devices are well known and need not be discussed at length here.

The manner and format in which information is exchanged may vary. In some implementations, application design environment 101 load a spreadsheet for design purpose that is stored locally. In other implementations, application design environment 101 may need to communicate with a remote source having the spreadsheet stored or hosted therein to obtain all or portions of the spreadsheet. In addition, application design environment 101 may upload a finished application to the application store 808. Likewise, the application store 808 may download an application into an execution environment 111. At run-time, the execution environment 111 may communicate with spreadsheet service 113 to exchange information and processing results.

In any of the aforementioned examples in which information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Referring now to FIG. 9, computing system 900 is representative of any suitable computing system that may be employed to implement all or portions of application design environment 101 and enhanced design process 200 or execution environment 111 and enhanced application process 300, and optionally any of the other environments, user interfaces, and operational scenarios and sequences described herein. Computing system 900 may be implemented as a single apparatus, system, or device or may be implemented in a distributed manner as multiple apparatuses, systems, or devices.

Examples of computing system 900 include, but are not limited to, desktop computers, laptop computers, tablet computers, notebook computers, mobile computing devices, cell phones, media devices, and gaming devices, as well as any other type of physical or virtual computing machine and any combination or variation thereof. Other examples of computing system 900 may also include server computers, cloud computing platforms, and data centers, as well as any other type of physical or virtual server machine, and any variation or combination thereof.

Computing system 900 includes, but is not limited to, processing system 901, storage system 903, software 905, communication interface system 907, and user interface system 909. Processing system 901 is operatively coupled with storage system 903, communication interface system 907, and user interface system 909. Processing system 901 loads and executes software 905 from storage system 903. When executed by processing system 901, software 905 directs processing system 901 to operate as described herein for enhanced design process 200 or its variations, or as described herein for enhanced application process 300 or its variations, and optionally as described for any of the environments, user interfaces, and operational scenarios and sequences disclosed herein. Computing system 900 may optionally include additional devices, features, or functionality not discussed for purposes of brevity.

Referring still to FIG. 9, processing system 901 may comprise a microprocessor and other circuitry that retrieves and executes software 905 from storage system 903. Processing system 901 may be implemented within a single processing device but may also be distributed across multiple processing devices or sub-systems that cooperate in executing program instructions. Examples of processing system 901 include general purpose central processing units, application specific processors, and logic devices, as well as any other type of processing device, combinations, or variations thereof.

Storage system 903 may comprise any computer readable storage media readable by processing system 901 and capable of storing software 905. Storage system 903 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 903 may also include computer readable communication media over which software 905 may be communicated internally or externally. Storage system 903 may be implemented as a single storage device but may also be implemented across multiple storage devices or sub-systems co-located or distributed relative to each other. Storage system 903 may comprise additional elements, such as a controller, capable of communicating with processing system 901 or possibly other systems.

Software 905 may be implemented in program instructions and among other functions may, when executed by processing system 901, direct processing system 901 to operate as described herein for enhanced design process 200 and its variations or enhanced application process 300 and its variations, and optionally as described with respect to the various environments, operational scenarios, and operational sequences disclosed herein. In particular, the program instructions may include various components or modules that cooperate or otherwise interact to carry out enhanced design process 200 or enhanced application process 300. The various components or modules may be embodied in compiled or interpreted instructions or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 905 may include additional processes, programs, or components, such as operating system software or other application software. Software 905 may also comprise firmware or some other form of machine-readable processing instructions executable by processing system 901.

In general, software 905 may, when loaded into processing system 901 and executed, transform a suitable apparatus, system, or device (of which computing system 900 is representative) overall from a general-purpose computing system into a special-purpose computing system customized to facilitate enhanced application design and development as described herein for each implementation. Indeed, encoding software 905 on storage system 903 may transform the physical structure of storage system 903. The specific transformation of the physical structure may depend on various factors in different implementations of this description. Examples of such factors may include, but are not limited, to the technology used to implement the storage media of storage system 903 and whether the computer-storage media are characterized as primary or secondary storage, as well as other factors.

For example, if the computer readable storage media are implemented as semiconductor-based memory, software 905 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 900 is generally intended to represent a computing system or systems on which software 905 may be deployed and executed in order to implement enhanced design process 200 or enhanced application process 300 and optionally all or portions of the various environments and operational scenarios and sequences described herein. However, computing system 900 may also be suitable as any computing system on which software 905 may be staged and from where software 905 may be distributed, transported, downloaded, or otherwise provided to yet another computing system for deployment and execution, or yet additional distribution.

Communication interface system 907 may include communication connections and devices that allow for communication with other computing systems (not shown) over a communication network or collection of networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 900 and any other computing system (not shown) may occur over a communication network or networks and in accordance with various communication protocols, combinations of protocols, or variations thereof. Examples of communication networks over which computing system 900 may exchange information with other computing systems include intranets, the Internet, local area networks, wide area networks, wireless networks, wired networks, or any combination or variation thereof. The aforementioned communication networks and protocols are well known and need not be discussed at length here.

User interface system 909 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 909. In some cases, the input and output devices may be combined in a single device, such as a display capable of displaying images and receiving touch gestures. The aforementioned user input and output devices are well known in the art and need not be discussed at length here.

User interface system 909 may also include associated user interface software executable by processing system 901 in support of the various user input and output devices discussed above. Separately or in conjunction with each other and other hardware and software elements, the user interface software and user interface devices may support a graphical user interface, a natural user interface, or any other type of user interface. For example, user interface 500 may be presented through user interface system 909. In addition, user input made with respect to user interface 500 can be input via user interface system 909. User interface 610 and user interface 710 may also be presented by user interface system 909.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. One or more computer readable storage media having program instructions stored thereon for facilitating application development that, when executed by a computing system, direct the computing system to at least:
examine a spreadsheet to identify a plurality of spreadsheet components of the spreadsheet with which to generate a plurality of application components for potential inclusion in a software application under design;
receive user input comprising a plurality of design instructions to include in the software application at least some of the plurality of application components; and
generate at least an instance of the software application comprising the plurality of application components, wherein to generate at least an instance of the software application, the program instructions direct the computing system to link each application component of the plurality of application components to a corresponding spreadsheet component of the plurality of spreadsheet components.

2. The one or more computer readable storage media of claim 1 wherein, to receive the user input, the program instructions direct the computing system to receive the user input via a user interface to an application design environment, wherein the user interface comprises a component view of the plurality of application components and a design canvas on which to design the software application via the user input.

3. The one or more computer readable storage media of claim 2 wherein each of the plurality of design instructions comprises an individual instruction to include one application component of the plurality of application components in the software application.

4. The one or more computer readable storage media of claim 3 wherein the individual instruction comprises a touch gesture that moves the one application component from the component view to the design canvas to include the one application component.

5. The one or more computer readable storage media of claim 4 wherein the user interface further comprises a properties view in which to present properties of any of the plurality of application components in the design canvas.

6. The one or more computer readable storage media of claim 2 wherein the user interface comprises an environment control through which to select an operating environment for the software application from a plurality of different operating environments, wherein the program instructions direct the computing system to publish the software application through an online application store associated with the operating environment and generate the software application for installation and execution in the operating environment, wherein the plurality of operating environments comprises Android and iOS.

7. The one or more computer readable storage media of claim 1 wherein to examine the spreadsheet to identify the plurality of spreadsheet components, the program instructions direct the computing system to examine each field of a plurality of fields in the spreadsheet to determine if the field has associated therewith at least one of a plurality of design characteristics comprising a formula, a control, and information stored therein representative of a category for other information stored in other fields of the plurality of fields.

8. A method for developing applications comprising:
examining a spreadsheet to identify a plurality of spreadsheet components of the spreadsheet with which to generate a plurality of application components for potential inclusion in a software application under design;
receiving user input comprising a plurality of design instructions to include in the software application at least some of the plurality of application components;
generating at least an instance of the software application comprising the plurality of application components; and
linking each application component of the plurality of application components to a corresponding spreadsheet component of the plurality of spreadsheet components.

9. The method of claim 8 wherein receiving comprises receiving the user input via a user interface to an application design environment, wherein the user interface comprises a component view of the plurality of application components and a design canvas on which to design the software application via the user input.

10. The method of claim 9 wherein each of the plurality of design instructions comprises an individual instruction to include one application component of the plurality of application components in the software application.

11. The method of claim 10 wherein the individual instruction comprises a touch gesture to move the one application component from the component view to the design canvas for inclusion in the one application component.

12. The method of claim 11 wherein the user interface further comprises a properties view in which to present properties of any of the plurality of application components in the design canvas.

13. The method of claim 9 wherein the user interface comprises an environment control through which to select an operating environment for the software application from a plurality of different operating environments, wherein the method further comprises publishing the software application through an online application store associated with the operating environment and generating the software application for installation and execution in the operating environment.

14. The method of claim 8 wherein examining the spreadsheet to identify the plurality of spreadsheet components comprises examining each field of a plurality of fields in the spreadsheet to determine if the field has associated therewith at least one of a plurality of design characteristics comprising a formula, a control, and information stored therein representative of a category for other information stored in others of the plurality of fields.

15. An apparatus comprising:
one or more computer readable storage media; and
program instructions stored on the one or more computer readable storage media and comprising an instance of an app generated from a spreadsheet, wherein the instance of the app, when executed by a processing system, directs the processing system to at least:
render a user interface to the app comprising a plurality of application components linked to a plurality of spreadsheet components in the spreadsheet through which to communicate with a spreadsheet service supporting the spreadsheet; and
in response to information received with respect to at least one application component of the plurality of application components, communicate the information to a corresponding spreadsheet component of the plurality of spreadsheet components for processing by the spreadsheet service.

16. The apparatus of claim 15 further comprising the processing system configured to execute the app, and wherein the program instructions further comprise a software design application that, when executed by the processing system, directs the processing system to at least:

examine the spreadsheet to identify the plurality of spreadsheet components of the spreadsheet with which to generate a plurality of application components for potential inclusion in the app while under design;

receive user input comprising a plurality of design instructions to include in the app at least some of the plurality of application components; and generate at least an instance of the app comprising the plurality of application components.

17. The apparatus of claim 16 wherein the processing system receives the user input via a user interface to the app, wherein the user interface to the app comprises a component view of the plurality of application components and a design canvas on which to design the app via the user input.

18. The apparatus of claim 17 wherein at least one of the plurality of design instructions comprises an individual instruction to include the one application component in the app.

19. The apparatus of claim 18 wherein the individual instruction comprises a gesture to move the one application component from the component view to the design canvas.

20. The apparatus of claim 17 wherein the user interface to the software design application comprises an environment control through which to select an operating environment for the app from a plurality of different operating environments, wherein the software design application further directs the processing system to publish the app through an online application store associated with the operating environment selected for the app, wherein the plurality of operating environments comprises an Android operating environment, an iOS operating environment, and a Windows operating environment.

* * * * *